United States Patent Office 2,819,159
Patented Jan. 7, 1958

2,819,159

METHOD OF RECLAIMING SCRAP STEEL

Robert E. Treybal, Hartsdale, William H. Kapfer, Tuckahoe, and Laimonis Bajars, New Rochelle, N. Y., assignors to Scrap Conservation Committee of the Steel Industry, New York, N. Y., an unincorporated association of New York No Drawing. Application November 8, 1954
Serial No. 467,644

4 Claims. (Cl. 75—45)

This invention relates to improvements in the art of separating adhering materials having different melting points, and relates more specifically to an improved method of removing tin or similar coatings from ferrous sheets or the like.

Many methods have been employed or suggested for removing the tin coating from ferrous materials, such as steel scrap, "tin" cans, and the like so that the reclaimed steel is of sufficient purity to be remelted and utilized in the formation of new steel. These methods have been either chemical or mechanical. Among the more common chemical methods are those wherein the steel scrap is placed into a solution containing a chemical solvent to a metallic salt which is dissolved in the solution, and the tin is recovered by suitable treatment of the solution. These chemical methods have proved to be commercially unsuccessful since the cost and quantity of solvent or reagent necessary is prohibitive when large scale operations are conducted. Also, these chemical processes usually cannot be performed within a single step or operation.

The mechanical methods which have been suggested involve the heating of the coated ferrous material to above the melting point of tin but below the melting point of the ferrous material, and, either permitting the melted tin to drop off or subjecting the heated material to some mechanical treatment, such as scraping, agitation or centrifugal action, to dislodge the molten metal. These mechanical methods have been found to be commercially ineffective since the adherence of the tin of the ferrous metal is so great that only the surplus tin is removed. The remaining adhering tin is of a sufficient quantity to render the ferrous material impure for the subsequent formation of new steel.

Since the presence of tin in the process of making new steel from the reclaimed scrap ferrous material makes such steel brittle, increases its hardness, decreases its ductility and generally makes for poor working qualities, it is of extreme importance that the amount of tin present in such a process be as low as possible.

It is a mjor object of this invention to reclaim ferrous material having a metallic coating adhering thereto, the purity of such ferrous material after the removal of the metallic coating being such that it may be added directly into a steel making process without any further purification.

Another object of this invention is to provide a process wherein the coating of tin present on the ferrous material is quickly and easily removed by melting the ferrous material, converting the tin to tin sulfide and then volatilizing the tin sulfide.

A further object of this invention is to provide a process of reclaiming a ferrous material coated with tin so that the tin content in the molten ferrous material is reduced to approximately 0.05–0.1% by weight of the ferrous material, which material is then sufficiently pure to be added to a steel making process for the manufacture of new steel.

A still further object is to effectively remove substantially all of the tin adhering to the steel scrap, including that which is on the surface, that which is enclosed in crimped portions of the scrap and therefore ordinarily inaccessible to detinning solvents, together with that which may be partly alloyed with the steel scrap and which also may be inaccessible to other known processes.

In attaining the objects of this invention, one feature resides in the adding of a sulfide of iron to the molten tin-bearing ferrous material in an amount ranging from approximately 50% to 200% or more in excess of that required to convert the tin to tin sulfide. Another feature resides in passing a current of inert gas into or over the molten ferrous material to increase the rate of volatilization of the tin sulfide from the molten mass.

Other objects, advantages and features of the invention will become apparent from the following specification.

The tin-coated ferrous material to be treated is placed in an appropriate furnace, such as an "open-hearth" type furnace and heated to its melting point. Any furnace in which the detinning is done must not be lined with a material such as calcium oxide, which would preferentially remove the sulfur, and prevent the formulation of tin sulfide. The steel scrap may contain such foreign matter as foodstuffs, paper, glue, enamel, etc. which are completely destroyed by the high temperature of the molten mass. To the molten ferrous material is added a sulfide or iron, such as iron monosulfide, commonly referred to as ferrous sulfide, FeS, or iron di-sulfide, known commonly as pyrite, $FeS_2$, in an amount 50–200% or more in excess of the quantity required to convert the tin present in the molten mass to tin sulfide. Experiments with various amounts of iron sulfides have shown that the greater the amount of sulfide present in the molten mass, the more rapid is the rate of detinning. A gas which is not particularly reactive with the steel, such as air, nitrogen, etc., is then blown through or passed over the molten mixture to greatly increase the rate of volatilization of the tin sulfide which has been formed. It is not necessary that such gas be under pressure. Adding a small amount of lime to the molten mass causes it to form a readily removable slag with any residual sulfur remaining therein. The resultant molten mass is essentially pure steel containing from 0.1–0.05%, and even as low as .01%, of tin by weight and which may be added directly into a steel making process for the production of new steel. It has been noted that carbon must be present in the steel scrap if detinning is to occur by this process. Detinning in the complete absence of carbon does not produce satisfactory results.

While it is preferable to use the mono- or di-sulfides of iron in this process, as they are in abundant supply, the same results can be achieved by the use of ferric sulfide $Fe_2S_3$, or iron tetrasulfide $Fe_3S_4$. These latter ingredients, however, are not as readily or economically obtainable in the market since they are of no particular industrial interest. It has also been noted that elemental sulfur, when used in place of the mono- or di-sulfides of iron also gives substantially similar results in that the tin within the molten ferrous mass is almost completely converted to tin sulfide and then volatilized. However, the principal drawback to the use of elemental sulfur in the process of reclaiming scrap steel is that much of the sulfur is lost by volatilization at the high temperatures, thus making its use very uneconomical.

It is to be emphasized that the presence of a very small amount of tin as an impurity in a steel-making process makes the steel which is formed brittle, besides increasing its hardness, decreasing its ductility and generally making for poor working qualities. Therefore, it is of the utmost importance that as much as possible of the tin coating on the steel scrap be removed.

The following examples disclose specific embodiments of the invention.

Example 1

150 parts by weight of tin-plated steel containing 2.1 parts (1.4%) by weight of tin is heated and melted at a temperature of 1750° C. 2.1 parts by weight of iron pyrites is added to the molten mass and air is bubbled through the molten mixture to volatilize the tin sulfide which has formed. The tin content of the molten mass after 30 minutes is .12% of the weight of the steel.

Example 2

150 parts by weight of tin-plated steel containing 2.1 parts (1.4%) by weight of tin and 2.1 parts by weight of iron pyrites is heated and melted at a temperature of 1750° C. Air is then continually swept over the surface of the melted mixture to volatilize the tin sulfide which is formed. The tin content of the molten mass after 30 minutes is .21% of the weight of the steel. After one hour of such treatment, the tin content is .03% of the weight of the steel.

Example 3

350 parts by weight of tin-plated steel containing 4.9 parts (1.4%) by weight of tin has added thereto 4.9 parts by weight of iron pyrites. The mixture is heated to a temperature in the range of 1410° C. to 1600° C. to form a molten mass and air is continually blown over the surface of the melt. The tin content after one hour of such treatment is .07%.

Example 4

909 parts by weight of tin-plated steel containing 4.55 parts (0.5%) by weight of tin is mixed with 6 parts by weight of iron pyrites and heated to a temperature of 1250° C. to 1425° C. Nitrogen is then blown over the surface of the molten mass for one hour at the end of which time the tin content of the mass is .07% by weight of the steel. After 1.25 hours of such treatment the amount of tin present in the mass is reduced to .04% by weight of the steel.

The amount of sulfide of iron utilized in each of the above examples is approximately 100% in excess of that required to convert the tin to tin sulfide. While any temperature above the melting point of steel seems satisfactory for the disclosed process, the rate of de-tinning the scrap steel is greater when the temperature of the molten mass is increased. The gas which is either bubbled through or passed over the molten mass during the process greatly aids in the volatilization of the tin sulfides.

Example 5

200 parts by weight of tin-plated steel containing 1.02% by weight of tin has added to it 3 parts by weight of iron pyrites and the mixture heated to 1500° C. Nitrogen is continuously passed over the surface of the molten mass and after one hour of such treatment, the tin content in the mass is reduced to 0.01% by weight of the steel.

The amount of iron pyrites utilized in Example 5 is approximately 200% in excess of that required to convert the tin to tin sulfide. Experiments have indicated that the larger the percentage of excess sulfur containing ferrous compound utilized in the process, the more rapid is the rate of detinning.

Example 6

200 parts by weight of tin-plated steel containing 0.90% by weight of tin has added to it 1.1 parts by weight of iron pyrites, and the mixture is heated to 1400° C. Nitrogen is continuously passed over the surface of the molten mass. After treatment of 1¼ hours, the tin content was reduced to 0.09% by weight of the steel.

Thus it may be observed that the use of a smaller amount of excess sulfur-containing ferrous compound, such as the 20% in excess illustrated in Example 6, decreases the rate of detinning of the steel scrap. Best results are usually obtained when the amount of sulfide of iron added to the steel scrap is approximately 50–200% or more in excess of that required to convert the tin present in the scrap to tin sulfide.

It is to be noted that while sulfides of iron are preferred in the above process other sulfides may conceivably be used provided that they do not have the disadvantage of volatilizing themselves at too low a temperature so that the tin sulfide does not have a sufficient opportunity to form in the molten mass.

While the above examples embodying this invention disclose the process as used with steel scrap containing from 0.5–1.4% tin, the process will function equally as well with scrap steel containing a higher percentage of tin, providing sufficient sulfide of iron is used.

While there have been shown and described several embodiments of the invention, it will be obvious to those skilled in the art that various changes and modifications can be made therein without departing from the invention and, therefore, it is aimed in the appended claims to cover all such changes and modifications as fall within the spirit and scope of the invention.

Having fully described the invention what is claimed is:

1. A process for forming steel having a tin content of 0.1–0.01% of the weight of the steel, said steel being suitable for use in the formation of new steel, comprising melting scrap steel having a tin content of at least 0.5–1.4% of the weight of the steel, adding to the molten scrap steel a member of the group consisting of elemental sulfur and sulfide of iron in an amount at least 50% and up to 200% in excess of that required to volatilize the tin as tin sulfide and maintaining said scrap steel in its molten state for approximately 30 to 60 minutes.

2. A process for forming steel having a tin content of 0.1–0.01% of the weight of the steel as defined in claim 1, wherein the sulfide of iron is ferrous sulfide.

3. A process for forming steel having a tin content of 0.1–0.01% of the weight of the steel as defined in claim 1, wherein the sulfide of iron is ferrous disulfide.

4. A process for forming steel having a tin content of 0.1–0.01% of the weight of the steel, said steel being suitable for use in the formation of new steel, comprising melting scrap steel having a tin content of at least 0.5–1.4% of the weight of the steel, adding to the molten scrap steel a member of the group consisting of elemental sulfur and sulfide of iron in an amount at least 50% and up to 200% in excess of that required to volatilize the tin as tin sulfide and continuously passing an inert gas through the molten mixture while maintaining said mixture in its molten state for approximately 30 to 60 minutes.

References Cited in the file of this patent

UNITED STATES PATENTS

| | | |
|---|---|---|
| 2,219,411 | Carlsson et al. | Oct. 29, 1940 |
| 2,304,197 | Osborn | Dec. 8, 1942 |